Figure 1:
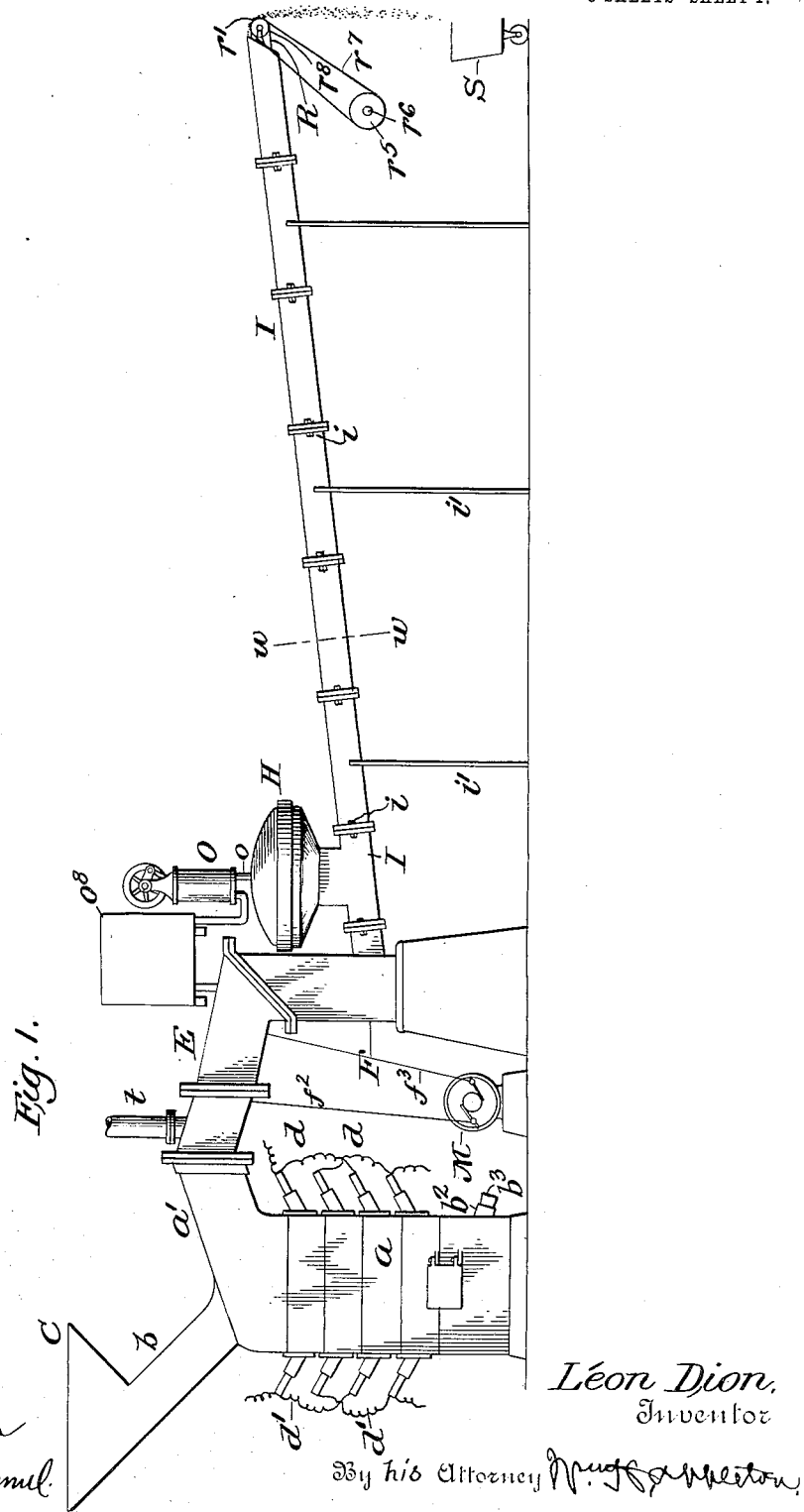

No. 840,480. PATENTED JAN. 8, 1907.
L. DION.
APPARATUS FOR RECOVERING METALS FROM ORES AND OTHER SUBSTANCES.
APPLICATION FILED MAR. 4, 1904.

3 SHEETS—SHEET 1.

Witnesses
W. C. Allan
James P. Duhamel

Léon Dion,
Inventor
By his Attorney

No. 840,480. PATENTED JAN. 8, 1907.
L. DION.
APPARATUS FOR RECOVERING METALS FROM ORES AND OTHER SUBSTANCES.
APPLICATION FILED MAR. 4, 1904.
3 SHEETS—SHEET 2.
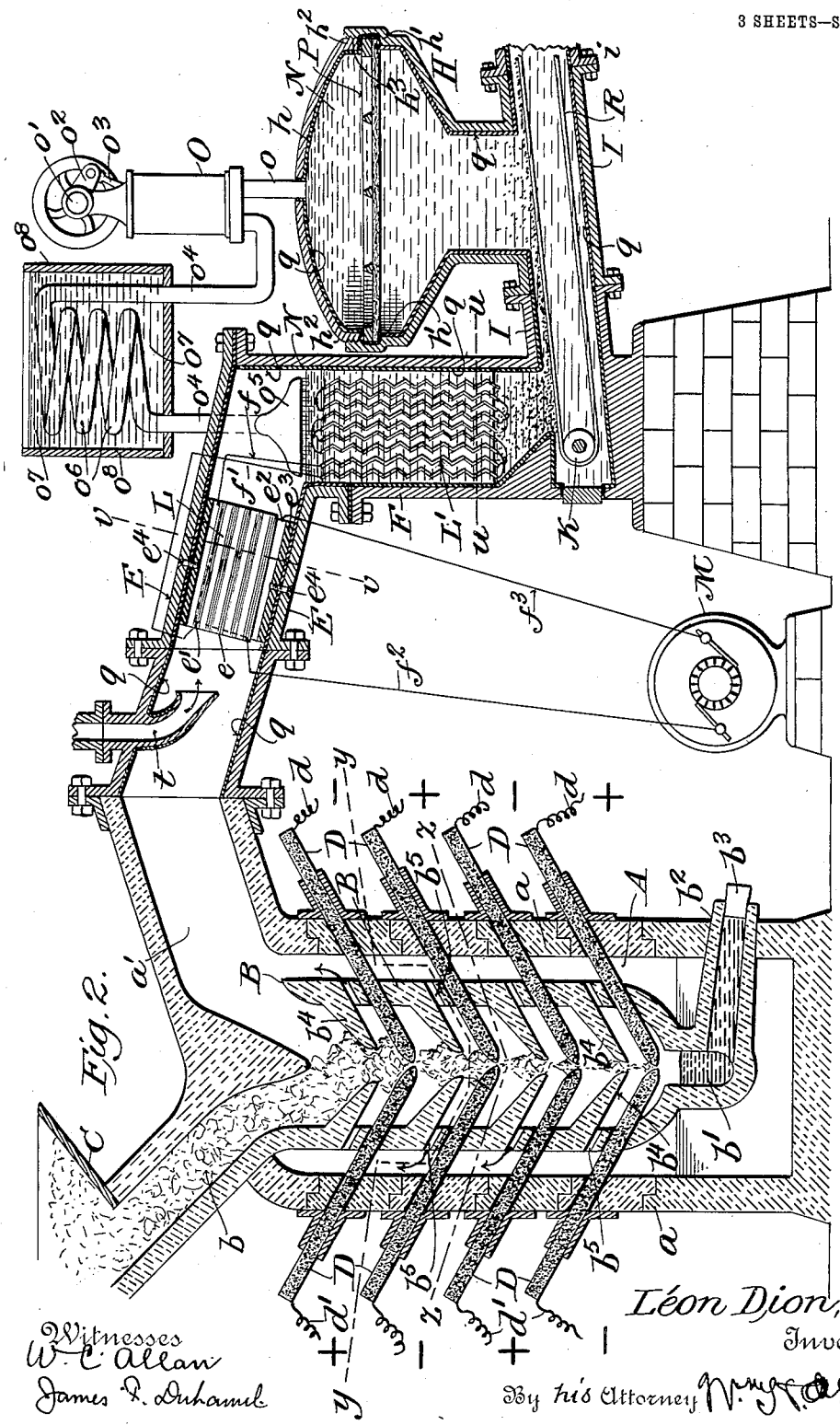
Witnesses
W. C. Allan
James P. Duhamel
Léon Dion,
Inventor,
By his Attorney No. 840,480. PATENTED JAN. 8, 1907.
L. DION.
APPARATUS FOR RECOVERING METALS FROM ORES AND OTHER SUBSTANCES.
APPLICATION FILED MAR. 4, 1904.
3 SHEETS—SHEET 3.
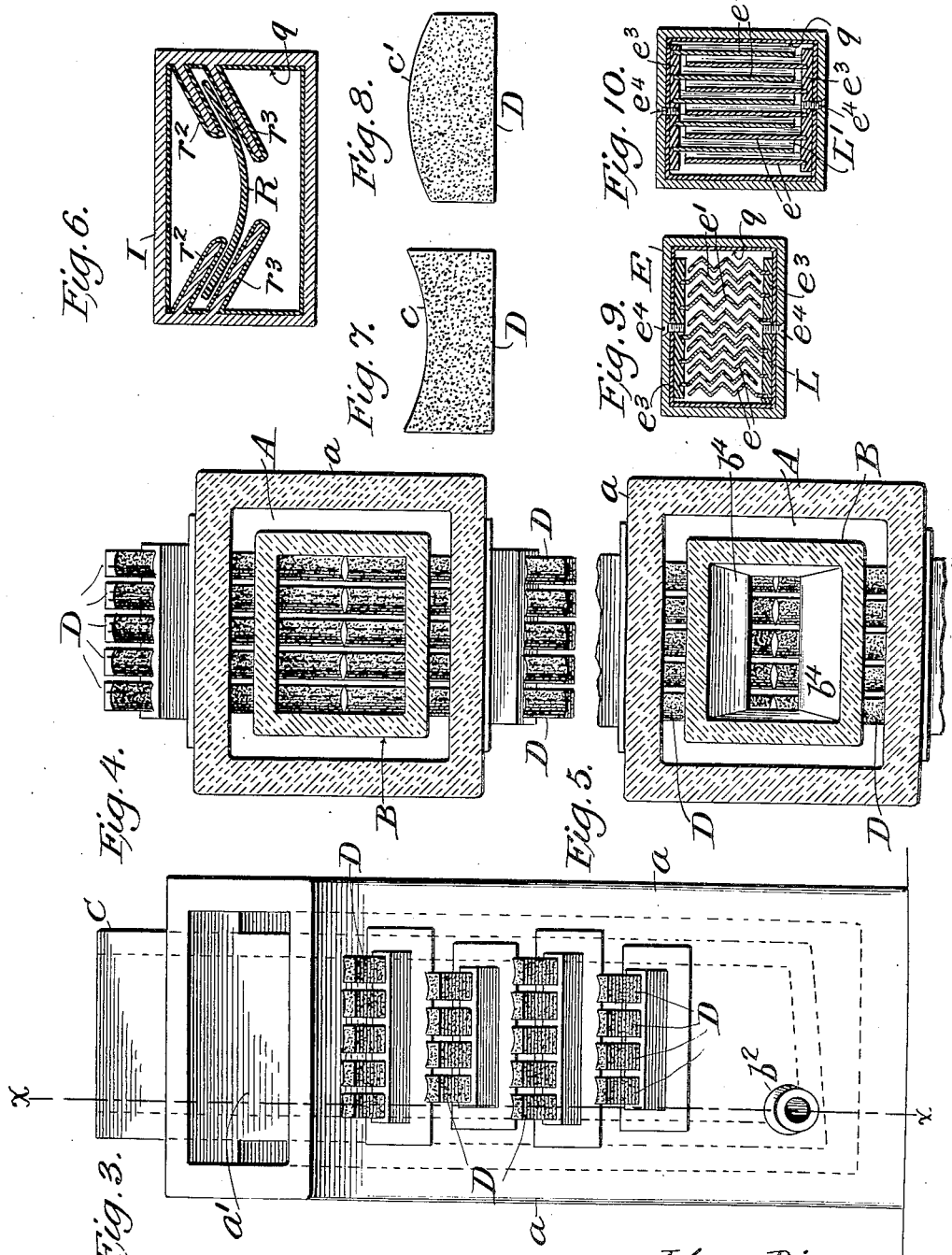
Witnesses
W. E. Allan
James F. Duhamel
Léon Dion,
Inventor,
By his Attorney

UNITED STATES PATENT OFFICE.

LÉON DION, OF NEW YORK, N. Y., ASSIGNOR TO THE AMERICUS ELECTRO-HERMATIC COMPANY, OF NEW YORK, N. Y., A CORPORATION OF ARIZONA TERRITORY.

APPARATUS FOR RECOVERING METALS FROM ORES AND OTHER SUBSTANCES.

No. 840,480.      Specification of Letters Patent.      Patented Jan. 8, 1907.

Application filed March 4, 1904. Serial No. 196,560.

*To all whom it may concern:*

Be it known that I, LÉON DION, a citizen of the United States, and a resident of the borough of Manhattan, in the city, county, and State of New York, have invented certain new and useful Improvements in Apparatus for Recovering Metals from Ores and other Substances, of which the following is a specification.

In an application for Letters Patent, filed by me in the United States Patent Office, even date herewith, and serially numbered 196,559, I have shown and described an apparatus for concentrating and recovering the metal or metals contained in the fumes, gases, or vapors arising from molten metal or metals and segregating the one from the other, when more than a single metal is contained in them, by subjecting these fumes, gases, or vapors to the action of a current or currents of electricity supplied in the one case through the medium of a single group of electrodes and in the other through a plurality of differently-constituted groups corresponding in number to that of the metals to be recovered, by passing the fumes gases, or vapors between and in contact with the electrodes in a dry chamber. By this treatment not only is or are the metal or metals contained in the fumes, gases, or vapors concentrated and precipitated into particles of appreciable size, but the particles or masses of one metal separated out and segregated from the other or others without the presence of water or other liquids being required.

My present invention differs from that just described in that while I first subject the fumes, gases, or vapors arising from the fused metal or metals to the action of an electric current or currents supplied through appropriate electrodes in a dry chamber I afterward subject them, with the particles of metal or metals already concentrated in this chamber, to the action of a second current or currents of electricity in a liquid bath, by which means not only are the particles or masses already precipitated by the action of the electric current in the dry chamber aggregated into larger masses, but any particles of metal remaining to the fumes, gases, or vapors after passing through that chamber also precipitated and recovered.

The object of my present invention is therefore to provide an apparatus by which this mode of treatment may be carried into effect; and to that end it consists in various constructions and combinations of parts, all as will hereinafter more fully appear.

Referring to the accompanying drawings, which form a part of this specification, Figure 1 is a side elevation of one form of an apparatus constructed in accordance with my invention, showing also a portion of a car by means of which the products of the apparatus may be carried away; Fig. 2, a vertical longitudinal section thereof on an enlarged scale taken in the plane $x\ x$ of Fig. 3 with certain of the parts broken away for convenience of illustration; Fig. 3, a rear elevation of the furnace detached; Fig. 4, a horizontal section taken on the line $y\ y$ of Fig. 2; Fig. 5, a similar horizontal section taken on the line $z\ z$ of Fig. 2; Fig. 6, a transverse vertical section taken in the plane $w\ w$ of Fig. 1; Figs. 7 and 8, end views, on an enlarged scale, of two forms of electrodes for use in the electric furnace when that form of furnace is employed; Fig. 9, a transverse section taken in the plane $v\ v$ of Fig. 2, and Fig. 10 a similar transverse section taken in the plane $u\ u$ of Fig. 2.

In all the figures like letters of reference are employed to designate corresponding parts.

While in the practice of my invention I may employ any of the ordinary and well-known forms of furnace for fusing the ores or other substances, the furnace which I have selected for purpose of illustration is of the electric form and is constructed with a chamber A, which is inclosed within suitable side walls $a$, formed from masonry or otherwise, and receives what I call herein a "crucible" B, in which the fusing of the ores or other substances is effected. In the construction of this chamber A any appropriate contour may be adopted, and the same is also true respecting the crucible B, but whatever their forms the crucible will preferably be of a dimension somewhat less than the interior of the chamber A, whereby to form a space between them to allow of the escape of the fumes, gases, or vapors which arise from the fusion of the ores or other substances and from the molten metal or metals. With the crucible thus arranged within the chamber A it is connected at its top with a hopper or receptacle C through the intervention of a chuteway $b$, and is constructed with a reservoir $b'$ in its lower portion, which is preferably provided with an outlet-pipe $b^2$, that extends therefrom to and through the walls $a$ of the furnace and to the outside thereof, where it may be equipped with suitable appliances—such, for instance, as a plug $b^3$—whereby the opening and closing of the passage-way through it may be effected when required.

Extending inward from opposite directions through the walls of both the furnace A and the crucible B with their inner ends in close relationship, but at a short distance apart, are the electrodes D, by means of which the current or currents of electricity to fuse the ores or other substances is or are applied. These electrodes may be of various forms. I prefer, however, to construct them in the form of plates, which may be made either of a width to extend entirely across the interior of the crucible B or of a width that will extend but partially across. In the drawings, however, I have shown them as made of a width to extend but partially across, with the upper surface of each provided longitudinally of its length with either a shallow concave groove $c$, as illustrated in Fig. 7, or with a convex rib $c'$, as shown in Fig. 8, and either or both of these forms may be adopted, as preferred, and the apparatus operate with equal efficiency.

When the electrode is made of a width to extend entirely across the interior of the crucible, then but a single positive and a single negative electrode in each set will be required. On the other hand, when the electrodes are made of a width to extend but partially across, then a number of positive and a number of negative electrodes will be required in each set, in which case the electrodes of each polarity will be placed edge to edge, and in the drawings I have shown five electrodes of each polarity as thus arranged.

In some instances but a single set of electrodes D will be required. In others a plurality of sets will be necessary, and in the drawings I have shown four sets as thus employed. When a plurality of sets of electrodes are made use of, the different sets are preferably disposed the one above the other, whereby to act successively upon the ores or other substances supplied to the crucible, and in such cases the electrodes of the different sets instead of being so disposed as to bring the longitudinal centers of constituent members of one set directly over the longitudinal centers of the constituent members of the next set they are arranged in *quincunx* order, with the longitudinal centers of the members of one set disposed in line with the spaces between the members of the other, whereby to prevent any of the ores or other substances supplied to the crucible B passing downward between the electrodes D without being brought in direct contact with one or the other. As thus arranged these electrodes D are connected with any appropriate source of electric supply—as, for instance, with a dynamo or dynamos—(not shown) through the intervention of suitable conductors $d$ and $d'$, which may be so arranged that the positive or $+$ electrodes of all the sets may be on one side of the furnace and the negative or $-$ electrodes of all the sets on the other. In the drawings, however, I have shown these electrodes so connected with the source of electric supply that the positive and negative members of the different sets alternate with one another on each side of the furnace with say the negative electrode of the upper set, the positive electrode of the next set, the negative electrode of the next, and the positive electrode of the bottom set, all on one side and the reverse of this arrangement on the other, with the positive electrodes of the upper set, the negative electrodes of the next, the positive electrodes of the next, and the negative electrodes of the bottom set arranged on the opposite side, and this is the arrangement I prefer in practice, as thereby a more efficient operation of the furnace is insured than when all the positive electrodes are arranged on one side and all the negative electrodes on the other.

With the electrodes arranged and connected as thus explained the crucible B is provided on its interior a short distance above each of the sets of electrodes with an inward and downwardly extending flange $b^4$, by which means the ore or other material supplied to the crucible are deflected inward toward its center and caused to fall upon the electrodes at the points of their nearest approach, while beneath each of these flanges $b^4$ are formed through the walls of the crucible a series of apertures $b^5$, through which the fumes, gases, or vapors arising from the fusing of the ore or other substances and from the molten metal or metals escape into the space between the crucible and the walls $a$ of the furnace, whence they pass upward and outward through a suitable passage-way $a'$, with which the furnace is provided, and are thence delivered to a trunk-like chamber E, in which the operation of concentrating and recovering the metal or metals from them is initiated. In the construction of this trunk-like chamber E any appropriate form in cross-section may be adopted. In the form of the invention which I have selected for purposes of illustration, however, it is constructed in rectangular form and is connected at one of its ends with the passage-way $a'$ and at its other with the upper end of a similar trunk-like chamber F, which is arranged in vertical relationship and is connected at its lower end with a suitable vessel or receptacle H, through the intervention of a passage-way I.

For effecting the concentration and recovery of the metals from the fumes, gases, or vapors passed through the chamber E from the chamber A, and thence through the chamber F, I make use of a current or currents of electricity, to the action of which these fumes, gases, or vapors are first subjected in a dry chamber and afterward exposed thereto in a liquid-chamber while being passed through it and acted upon by a liquid bath sprayed upon them. The tension and volume of the current thus applied to accomplish the most efficient results will vary more or less, depending upon the nature of the material to be recovered and the size of the apparatus employed. When the material to be recovered is copper, for instance, and the apparatus is small, a current having a tension of one hundred and ten volts and a volume of one-half ampere has been found to give good results. When, on the other hand, other material are to be recovered and the apparatus employed is of larger dimensions, then the tension and volume of the current employed will in most instances have to be varied, those above given being merely directory and suited only to a given material and size of apparatus. The means through the current or currents of electricity is or are thus caused to act upon the fumes, gases, or vapors consists of the groups of electrodes L and L', of which the group L is located within the chamber E and the group L' within the chamber F. Between the electrodes as thus disposed the fumes, gases, or vapors are passed, as these latter travel along through the chambers E and F, with the result that they are acted upon by the current or currents of electricity traveling across from one electrode to another and the attractive force of the molecules or particles composing them or contained in them are thereby intensified, with the consequent effect that they are drawn together and caused to cohere into masses of appreciable size, which may be recoverable in that form. The electrodes thus employed may be constructed in various forms. I prefer, however, to construct them from corrugated plates made from appropriate material or materials, with those constituting the positive or + elements $e$ arranged side by side in parallel relationship and secured at one of their edges to a base-plate $e'$, while those constituting the negative or − elements $e^2$ are similarly arranged side by side and secured to a corresponding base-plate $e^3$.

With the electrodes constructed as thus described the groups L and L' are respectively secured within the trunk-like chambers E and F by screws $e^4$ passing through the base-plates $e'$ and $e^3$ and engaging with the walls of those chambers, with the positive or + elements of each extending between and alternating with the negative or − elements thereof, but without contacting with them or without the extension of either of the elements sufficiently far across to contact with the base-plate of the others.

In some instances the corrugations contained in the plates forming the electrodes of the groups L and L' may extend in the direction of the length of those plates, while in others they may extend transversely of them. In the drawings, however, I have shown these corrugations as extending in the direction of the length of the plates of the group L and as extending transversely of the plates of the group L', and this is the arrangement I prefer in practice, for while they allow of the fumes, gases, or vapors passing in a more or less direct course between the plates of group L they retard their movement in passing between the plates of groups L' because of the sinuous course they are called upon to traverse in traveling between them.

The positive and negative electrodes being constructed and arranged as above explained, the positive electrodes $e$ of each group are electrically connected, as are also the negative electrodes $e^2$ thereof, through their respective base-plates $e'$ and $e^3$, which are preferably constructed of some electricity-conducting material—such, for instance, as copper—with the positive electrodes of both groups connected with a source of electric supply—as, for example, with a dynamo M.

In some instances the electrodes of each group may be connected directly with the source of electric supply in multiple circuit, in which cases the positive and negative electrodes of each group will be connected directly with it through appropriate conductors extending between them. In the drawings, however, I have shown these electrodes connected with it in serial circuit, the positive and negative electrodes of one group being respectively connected with the positive and negative electrodes of the other by appropriate conductors $f$ and $f'$ with the positive and negative electrodes $e$ and $e^2$ of the group L, respectively, connected with the positive and negative poles of the source of electric supply through appropriate conductors $f^2$ and $f^3$, and either of these forms of connection with the source of electric supply may be adopted as preferred.

With the electrodes disposed and connected as thus described the group L' is submerged within water or other appropriate liquid N, which is preferably supplied to its upper end in the form of a spray and passes downward between the members thereof in that condition. This liquid may be supplied from any convenient source, but preferably from the vessel or receptacle H, which serves as a reservoir therefor and which for the purpose is conveniently constructed with a contracted lower portion and with an enlarged upper globular portion, as shown. For supplying the liquid from this vessel or receptacle H to the electrodes L', I make use of a pump O, which, connected with the vessel or receptacle H through a pipe $o$ and operated from an appropriate shaft $o'$, through the intervention of a crank $o^2$ and pitman $o^3$, is likewise connected with the chamber F through the intermediary of a pipe $o^4$, which enters the upper end of the chamber F directly over the electrodes L' and is provided at its end with an appropriate spraying device $o^5$, that is located directly above them. As thus arranged, with the lower end of the chamber F connected with the lower portion of the vessel or receptacle H through the passage-way I, as before explained, the liquid N is caused to flow in a circuit, passing upward first from the vessel or receptacle H to the pump O, thence through the pipe $o^4$ to the chamber F, where it is discharged upon the upper end of the electrodes L' in the form of a spray, thence downward between them into the passage-way I, and thence back into the vessel or receptacle H, and so on in continuous repetition.

With a view to abstracting the heat from the liquid N in thus circulating through the vessel or receptacle H and between the electrodes L', and thereby cooling it, the pipe $o^4$, instead of extending directly from the pump O to the interior of the chamber F, is preferably formed into a coil $o^6$ for a portion of its length and the portion thus coiled immersed in a body of moving water or other cooling agent $o^7$, contained in a suitable reservoir $o^8$. While in order to remove any particles of metal or metals that may be held in mechanical suspension in it I make use of a filter P. This filter, which may be constructed of any appropriate material and in any approved form, is here shown as composed of a carbon-sheet secured to or mounted upon a suitable frame P, and as thus constructed and mounted it is preferably supported with its frame within the upper enlarged globular portion of the vessel or receptacle H in transverse relationship thereto.

To permit of the filter being thus supported, the upper portion of the vessel or receptacle is preferably constructed as a removable top or cap $h$, with the portion below counterbored for a short distance at its upper end, whereby to form a shoulder or ledge $h'$. Upon the shoulder or ledge thus formed the edge of the filter rests and is firmly clamped with its frame by the removable top $h$, which, provided around its upper edge with a screw-thread $h^2$, engages when adjusted in place with a corresponding female screw-thread $h^3$, formed in the interior of the upper end of the counterbored portion, as shown. As thus arranged, not only is the filter firmly clamped in place, but ready access to it afforded for repairs and otherwise when desired.

While the chamber F and vessel or receptacle H are constructed as above explained, the passage-way I, by which they are connected at their lower end, is preferably made of rectangular form in cross-section, and, disposed in an upward inclined relationship, from its inner to its outer end, is constructed of a sufficient length to carry its outward extremity some distance above the top of the vessel or receptacle H, whereby to prevent the overflow of the liquid N circulating therethrough.

In some instances this passage-way may be made continuous throughout. In the drawings, however, I have shown it as made up from a number of sections joined end to end by suitable bolts $i$ and supported in its inclined relationship by appropriate supports $i'$. As thus arranged and supported this passage-way has journaled within its respective inner and outer ends the rolls $r$ and $r'$, upon which is mounted an endless carrying-apron R for receiving, carrying forward, and depositing in a suitable car or other receptacle S placed at the discharging end of the passage-way to receive them the particles or masses of metal deposited upon its surface from the chamber F and vessel or receptacle H.

With the endless carrying-apron R mounted upon the rolls $r$ and $r'$ the upper ply thereof is preferably supported at points intermediate those rolls and given a downwardly-curved trough-like contour throughout the greater portion of its length, whereby to prevent the escape over its edges of any of the particles or masses of metal or metals deposited upon it by inwardly and downwardly inclined flanges $r^2$ and $r^3$, projecting inward, respectively, above and below each of its edges from the interior of the passage-way, as shown in Fig. 6. As thus supported, a traveling movement is imparted to the apron R in the required direction to carry forward and deliver the materials deposited upon it from the carrying-roll $r'$, which is or may be rotated from a pulley $r^5$ upon an appropriate shaft $r^6$ through the intervention of an endless belt $r^7$ and a pulley $r^8$, with which the roll $r'$ is itself provided.

While the delivery of the particles or masses of metal or metals concentrated by the electrodes L and L' and deposited upon the traveling apron R is thus effected, the escape and loss of the current or currents of electricity employed in the concentrating operation through the chambers E and F, the vessel or receptacle H, and the passage-way I is prevented by applying to their respective interiors an insulating-lining $q$. In like manner the escape and loss of the current or currents through the electrodes D, the filter P, the pipe o, the rolls r and r', and such other parts as may be subjected to its or their action is similarly prevented by interposing suitable insulating material between them and the parts in which they are respectively supported, all as is common to apparatus employing electric currents as ordinarily in use.

With the parts constructed and arranged as above described, the pump O and carrying-apron R in operation, and an appropriate current or currents of electricity supplied to the various electrodes, the operation of the machine is as follows: The ore or other substances supplied to the hopper or receptacle C travels downward therefrom through the chuteway b to the electrodes D, where passing between the positive and negative elements of the different sets they are fused and the molten metal or other products resulting therefrom deposited in the reservoir $b'$, from which they may be drawn off from time to time through the outlet-pipe $b^2$, as may be desired. In being subjected to the action of the current or currents of electricity in thus traveling between the positive and negative elements of the different sets of electrodes the fumes, gases, or vapors arising from the fusing and fused metal or metals contained in the ore or other substances pass outward through the apertures $b^5$, formed through the walls of the crucible B, into the chamber A, whence they ascend through the passage-way $a'$ and are discharged into the chamber E. As thus discharged these fumes, gases, or vapors are carried forward through this chamber between the group of electrodes L, where they are subjected to the action of an electric current or currents supplied to these last, and a portion of the metal or metals contained in them thereby concentrated and precipitated in the form of particles or masses of appreciable size. After having been thus treated by the electrodes L the portions of the fumes, gases, or vapors remaining with the particles or masses of metal or metals precipitated thereby are discharged into the chamber F, whence they pass downward between the groups of electrodes L', where along with a further current of electricity they are at the same time subjected to the action of a liquid bath applied to them in the form of a spray, with the consequent result that the metal or metals remaining in them are concentrated and with the particles concentrated by the action of the electrodes L and aggregated into masses of larger size by the action of the electrodes L' in the liquid bath precipitated upon the carrying-apron R, whence they are carried forward automatically and discharged into a suitable receptacle arranged to receive them. The liquid N after having thus passed downward between the group of electrodes L thence flows through the passage-way I into the vessel or receptacle H, in which it is drawn upward through the filter P by the action of the pump O, and thence discharged again into the chamber F above the electrodes in the form of a spray, and so on continuously. In thus passing upward through the filter P any particles of metal or metals held in mechanical suspension in this liquid are separated out thereby and may be recovered from the under surface of the filter by scraping or otherwise, while the passage of the liquid in the form of a spray downward between the electrodes of the group L' act on the principle of a "trompe" to draw and force the fumes, gases, or vapors arising from the molten metal in the furnace A through the apparatus. In most instances the current thus imparted to these fumes, gases, or vapors by this trompe-like action will be sufficient to carry them forward through the machine; but in order to insure of it passing therethrough I sometimes supplement its action by a current of air, which may be supplied from a blower or other source of supply (not shown) through the intervention of the inlet-pipe t, which extends through the walls of the chamber E at any convenient point therein. Thus, as will be seen, not only is the fusing of the ores or other substances effected, but the concentration and recovery of the metal or metals arising therefrom in the shape of fumes, gases, or vapors, and the delivery of the metal or metals resulting from this concentration and recovery from the machine into an appropriate receptacle arranged to receive it accomplished as well.

While in the drawings I have shown the current for energizing the electrodes L and L' as supplied from an ordinary dynamo, I wish it distinctly understood that this is merely illustrative and that any other appropriate source of electric supply may be employed in lieu thereof, if preferred. Again, while in the drawings I have shown and in the foregoing described a form of electric furnace which I have found convenient for use in practice, I make no claim to such furnace herein, as the same forms the subject of a separate application filed April 30, 1906, and serially numbered 314,336, the same being a division of this application.

Having now described my invention and specified certain of the ways in which it is or may be carried into effect, I claim and desire to secure by Letters Patent of the United States—

1. The combination, with a plurality of chambers through which the fumes, gases, or vapors arising from molten metal or metals may be passed, a group of electrodes arranged in each of such chambers, and means through which an electric current may be supplied to these electrodes, of a liquid bath in which a portion only of such groups of electrodes is submerged, and a receptacle in which the particles or masses of metal or metals resulting from the concentration of the fumes, gases, or vapors by the electric currents through the electrodes are accumulated, substantially as described.

2. The combination, with a plurality of chambers through which the fumes, gases, or vapors arising from molten metal or metals may be passed, a group of electrodes arranged in each of such chambers, and means through which an electric current may be supplied to these electrodes, of means for passing a liquid between the electrodes of one chamber without submerging the electrodes of any of the others, and a receptacle in which the particles or masses of metal or metals resulting from the concentration of the fumes, gases, or vapors by the electric currents through the electrodes are accumulated, substantially as described.

3. The combination, with a plurality of chambers through which the fumes, gases, or vapors arising from molten metal or metals may be passed, a group of electrodes arranged in each of these chambers, and means through which an electric current may be supplied to such electrodes, of means for passing a liquid between the electrodes of one chamber, and a traveling apron arranged to travel across the end of one of said chambers whereby to receive and discharge the particles or masses of metal or metals resulting from the concentration of the fumes, gases, or vapors by the electric currents acting through the electrodes, substantially as described.

4. The combination, with a plurality of chambers through which the fumes, gases, or vapors arising from molten metal or metals may be passed, a group of electrodes arranged in each of these chambers, and means through which an electric current may be supplied to such electrodes, of means for passing a liquid current between the electrodes of one chamber without submerging the others, and a receptacle in which the particles or masses of metal or metals resulting from the concentration of the fumes, gases, or vapors by the electric currents acting through the electrodes may be accumulated, substantially as described.

5. The combination, with a plurality of chambers through which the fumes, gases, or vapors arising from molten metal or metals may be passed, a group of electrodes arranged in each of these chambers, means through which an electric current may be supplied to each of these electrodes, and a vessel or reservoir, of means for circulating a liquid between the electrodes of one of said chambers and through such vessel or receptacle, and a receptacle in which the particles or masses of metal or metals resulting from the concentration of the fumes, gases, or vapors by the electric currents acting through the said electrodes are accumulated, substantially as described.

6. The combination, with a chamber through which the fumes, gases, or vapors arising from molten metal or metals may be passed, a group of electrodes arranged therein, with spaces between the elements thereof through which such fumes, gases or vapors may travel and means through which a current of electricity may be supplied to such electrodes, of means by which a liquid may be passed between such electrodes in the form of spray, substantially as described.

7. The combination, with a chamber through which the fumes, gases, or vapors arising from molten metal or metals may be passed, a group of electrodes arranged therein, and means through which a current of electricity may be supplied to such electrodes, of a vessel or receptacle, a filter arranged in such vessel or receptacle, and means whereby the circulation of a liquid through both the vessel or receptacle and between the electrodes may be effected, substantially as described.

8. The combination, with a vertically-disposed chamber, a group of electrodes arranged therein, and means through which a current of electricity may be supplied to these electrodes, of a vessel or receptacle, a passage-way connecting this vessel or receptacle with the chamber, a pump, and pipes by which it is connected with both the chamber and the vessel or receptacle, whereby the circulation of a liquid through the vessel or receptacle and between the said electrodes may be effected, substantially as described.

9. The combination, with a chamber through which the fumes, gases, or vapors arising from molten metal or metals may be passed, a group of electrodes arranged therein, means by which a current of electricity may be supplied to such electrodes, a vessel or receptacle, and a passage-way by which this vessel or receptacle is connected with such chamber, of a pump, pipes connecting this pump with both the vessel or receptacle and with the chamber, and means by which the cooling of the pipe extending from the pump to the chamber with its contents may be effected, substantially as described.

In testimony whereof I have hereunto set my hand this 27th day of February, 1904.

LÉON DION.

Witnesses:
Wm. H. Appleton,
R. F. Sweeny.